United States Patent
Gassmann et al.

(10) Patent No.: US 12,276,335 B2
(45) Date of Patent: Apr. 15, 2025

(54) LUBRICATION FOR AN ELECTRIC DRIVE ARRANGEMENT FOR A VEHICLE

(71) Applicant: GKN Automotive Limited, Birmingham (GB)

(72) Inventors: Theodor Gassmann, Siegburg (DE); John Foulsham, Hampshire (GB); Daniel Beeby, Norfolk (GB)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/570,094

(22) PCT Filed: Jul. 30, 2021

(86) PCT No.: PCT/EP2021/071442
§ 371 (c)(1),
(2) Date: Dec. 14, 2023

(87) PCT Pub. No.: WO2023/006216
PCT Pub. Date: Feb. 2, 2023

(65) Prior Publication Data
US 2024/0271692 A1 Aug. 15, 2024

(51) Int. Cl.
*F16H 57/04* (2010.01)
*B60K 1/00* (2006.01)
*B60K 11/02* (2006.01)

(52) U.S. Cl.
CPC .......... *F16H 57/0476* (2013.01); *B60K 11/02* (2013.01); *F16H 57/0412* (2013.01);
(Continued)

(58) Field of Classification Search
CPC ............. F16H 57/0412; F16H 57/0435; F16H 57/0436; F16H 57/0441; F16H 57/0476;
(Continued)

(56) References Cited

U.S. PATENT DOCUMENTS 4,343,153 A * 8/1982 Kern ......................... F15B 7/10
60/475
10,414,363 B2 * 9/2019 Kim ......................... F16N 25/00
(Continued)

FOREIGN PATENT DOCUMENTS

CN 103419622 A 12/2013
EP 3517335 A1 1/2019
(Continued)

OTHER PUBLICATIONS

International Search Report and Written Opinion for PCT/EP2021/071442 mailed Apr. 7, 2022 (11 pages).
(Continued)

*Primary Examiner* — Minh Truong
(74) *Attorney, Agent, or Firm* — Reising Ethington P.C.

(57) ABSTRACT

An electric drive arrangement for a vehicle includes a housing. The electric drive arrangement includes an electric machine with a stator connected to the housing and a rotor with a rotor shaft rotatably supported in the housing. The electric drive arrangement includes a transmission to transmit a rotary movement from the rotor shaft to drive a driveline of the vehicle. The electric drive arrangement includes a hydraulic circuit for circulating a fluid to cool and lubricate the electric machine and the transmission.

16 Claims, 2 Drawing Sheets

(52) U.S. Cl.
CPC ..... *F16H 57/0435* (2013.01); *F16H 57/0436* (2013.01); *F16H 57/0453* (2013.01); *B60K 1/00* (2013.01); *B60K 2001/006* (2013.01); *F15B 2211/20561* (2013.01)

(58) Field of Classification Search
CPC . B60K 11/02; B60K 2001/006; F15B 13/028; F15B 2211/20561; F15B 2211/31541; F15B 2211/31547
See application file for complete search history.

(56) References Cited

U.S. PATENT DOCUMENTS

| | | | |
|---|---|---|---|
| 10,622,869 B2 | 4/2020 | Kiyokami et al. | |
| 10,703,184 B2 | 7/2020 | Nilsson et al. | |
| 2004/0045749 A1 | 3/2004 | Jaura et al. | |
| 2006/0223670 A1 | 10/2006 | Nishikawa et al. | |
| 2014/0234124 A1* | 8/2014 | Ruhle | F16H 57/0473 417/364 |
| 2016/0178548 A1 | 6/2016 | Berry | |
| 2016/0230900 A1* | 8/2016 | Schulz | F15B 13/028 |
| 2017/0218833 A1* | 8/2017 | Mitteer | F01P 7/14 |
| 2017/0227005 A1* | 8/2017 | Böhm | F04C 15/06 |
| 2018/0045090 A1* | 2/2018 | Kiyokami | F01M 5/005 |
| 2018/0241288 A1 | 8/2018 | Murakami et al. | |
| 2019/0229582 A1 | 7/2019 | Ito et al. | |
| 2021/0001714 A1 | 1/2021 | Oechslen | |
| 2022/0282784 A1* | 9/2022 | Nakata | F16H 57/0424 |
| 2023/0010604 A1* | 1/2023 | Ishikawa | H02K 9/19 |

FOREIGN PATENT DOCUMENTS

| | | |
|---|---|---|
| EP | 3627004 A1 | 3/2020 |
| JP | 2004100956 A | 4/2004 |
| JP | 2017530311 A | 10/2017 |
| JP | 2019048549 A | 3/2019 |

OTHER PUBLICATIONS

JP Office Action for JP Application No. 2024-505389 dated Dec. 19, 2024 (15 pages).

* cited by examiner

LUBRICATION FOR AN ELECTRIC DRIVE ARRANGEMENT FOR A VEHICLE

CROSS-REFERENCE TO RELATED APPLICATIONS

This application is a national stage of, and claims priority to, Patent Cooperation Treaty Application No. PCT/EP2021/071442, filed on Jul. 30, 2021, which application is hereby incorporated herein by reference in its entirety.

BACKGROUND

From US 2019/0229582 A1, a vehicle drive device is known with a lubricating path including a first oil pump to pump an oil stored in a casing by the first oil pump and to supply the oil to a power transmission mechanism for lubricating the power transmission mechanism, and a cooling path that is separated from the lubricating circuit and provided for the rotating electric machine, the cooling path including a second oil pump to pump up the oil stored in the casing by the second oil pump to supply the oil exclusively to the rotating electric machine for cooling the rotating electric machine, the second oil pump is an electric oil pump, and the cooling path is provided with an oil cooler cooling the oil to be supplied to the rotating electric machine.

From US 2016/0178548 A1, a method for dynamically monitoring temperature of a fluid at a heat generating device is known, which includes monitoring, using a temperature sensor, temperature of the fluid held in a fluidic sump. A first fluidic flow rate and a second fluidic flow rate are determined. A third fluidic flow rate and a temperature drop of the fluid across the heat exchanger in the active coolant circuit are determined based upon the temperature of the fluid and the third fluidic flow rate through the active coolant circuit. A fluid temperature supplied to the electric machine through the active coolant circuit is determined based upon the third fluidic flow rate and the temperature drop of the fluid across the heat exchanger. An effective temperature of the fluid is determined based upon the temperature of the fluid in the sump and the temperature of the fluid supplied to the electric machine through the active coolant circuit.

US 2018/241288A1 discloses a rotating electrical machine cooling structure with a cooling medium that is supplied by a pump to a stator and rotor of a rotating electrical machine, thereby cooling the stator and rotor, the rotating electrical machine cooling structure comprising a first passage that supplies the cooling medium from the pump to the stator; a second passage that supplies the cooling medium from the pump to the rotor; and a valve that regulates a flow of the cooling medium of the first passage and a flow of the cooling medium of the second passage, wherein a cooling state of the stator and a cooling state of the rotor are controlled by the valve.

EP 3 517 335 A1 discloses an electric vehicle that includes a power control unit, a driving motor, a first cooling channel fitted with a first pump that causes a first cooling liquid cooled in a first heat exchanger to flow through the power control unit and a second heat exchanger in this order and return to the first heat exchanger, and a second cooling channel fitted with a second pump that causes a second cooling liquid cooled by the first cooling liquid in the second heat exchanger to flow through the driving motor and return to the second heat exchanger. The second pump starts or stops circulation of the second cooling liquid, or increases or reduces a circulation volume of the second cooling liquid, based on one or both of the temperature of the power control unit and the temperature of the first cooling liquid.

SUMMARY

The present disclosure relates to an electric drive arrangement for a vehicle. The electric drive arrangement comprises a housing, an electric machine with a stator connected to the housing and a rotor with a rotor shaft rotatably supported in the housing, a transmission to transmit a rotary movement from the rotor shaft to drive a driveline of the vehicle, and a hydraulic circuit for circulating a fluid to cool and lubricate the electric machine and the transmission.

The electric machine and the transmission have different cooling and lubrication requirements, which depend on operation conditions. A performance of the electric machine is thermally limited in operation. Inherent losses may occur in the copper, iron and magnets of electric motors, where material properties limit the temperatures of the respective components and structures. Effective cooling is necessary to achieve adequate torque performance. A passive splash lubrication of the transmission results in churning losses under high-speed operation. The combination of cooling and lubrication for both the electric machine and the transmission is a compromise with regard to efficiency.

Disclose herein is an electric drive for a vehicle with a hydraulic circuit for circulating a fluid for efficient cooling and lubrication of the electric machine and the transmission.

The electric drive arrangement for a vehicle comprises:
a housing;
an electric machine with a stator connected to the housing and a rotor with a rotor shaft rotatably supported in the housing;
a transmission to transmit a rotary movement from the rotor shaft to drive a driveline of the vehicle; and
a hydraulic circuit for circulating a fluid to cool and lubricate the electric machine and the transmission, the hydraulic circuit comprising:
a bi-directional pump, which on a suction side is hydraulically connected to an oil sump of the housing, a pump-actuated switch valve hydraulically connected to the bi-directional pump, a first hydraulic path connecting the switch valve with cooling nozzles of the electric machine, a second hydraulic path connecting the switch valve with a portion of the transmission, and a heat exchanger for cooling the fluid pumped by the bi-directional pump through the switch valve.

When the bi-directional pump is operated in a first direction of rotation, the switch valve is transferred into a first position in which fluid is pumped through the heat exchanger to the first hydraulic path for cooling the electric machine, and, when the bi-directional pump is operated in a second direction of rotation, the switch valve is transferred into a second position in which fluid is pumped through the heat exchanger to the second hydraulic path for cooling and/or lubricating the transmission.

An advantage of the electric drive arrangement is that the two directions of rotation of the bi-directional pump provide two modes of the hydraulic circuit to optimize the cooling and lubrication of the electric machine and the transmission depending on the actual cooling and lubrication requirements by switching between the first and second direction of rotation. The second direction of rotation of the bi-directional pump can advantageously be applied for high speed operation of the vehicle and high rotation speed of the rotor and the transmission parts which are supplied with fluid for cooling and lubrication. In high speed operation, the torque requirements of the electric machine are lower and spray cooling of the electric machine via the cooling nozzles is not required.

The first direction of rotation of the bi-directional pump can advantageously be applied for low speed operation of the vehicle and lower rotation speed of the rotor and the transmission parts. However, high torque requirements are common in low speed and high currents result in copper losses. The fluid supplied to the cooling nozzles can advantageously cool stator end-windings of the electric machine, thus reducing the losses. A high-pressure spray cooling of the winding heads is provided when the bi-directional pump is operated in the second direction of rotation and the lubrication of the transmission does not require active fluid supply. The passive splash lubrication of the transmission is effective under low speed conditions as churning losses are lower due to low rotation speeds.

The fluid circulated in the hydraulic circuit is a cooling and lubricating fluid, e.g., an oil. The oil sump may as well be referred to as a reservoir and is arranged to gather fluid which drips off of the electric machine and the transmission due to gravitational force.

According to an embodiment, the switch valve has a first inlet connected to a first pressure side of the bi-directional pump and a second inlet connected to a second pressure side of the bi-directional pump. The switch valve is actuated into the first position by pressurizing the first inlet and into the second position by pressurizing the second inlet.

The switch valve may have a first heat exchanger outlet hydraulically connected to the heat exchanger and a second heat exchanger outlet hydraulically connected to the heat exchanger. When the switch valve is in the first position, fluid flows from the first inlet to the heat exchanger. When the switch valve is in the second position, fluid flows from the second inlet to the heat exchanger. The switch valve may further have a third inlet hydraulically connected to the heat exchanger, a first outlet to the first hydraulic path and a second outlet to the second hydraulic path. When the switch valve is in the first position, fluid flows from the heat exchanger to the first outlet. When the switch valve is in the second position, fluid flows from the heat exchanger to the second outlet.

According to a further embodiment, when the bi-directional pump is operated in the first direction of rotation, the first pressure side is pressurized to a first pressure level to supply fluid to the cooling nozzles for cooling stator end-windings of the stator. When the bi-directional pump is operated in the second direction of rotation, the second pressure side is pressurized to a second pressure level to supply fluid for active cooling of the rotor and active lubrication of the transmission. The first pressure level may be higher than the second pressure level.

According to a further embodiment, the second hydraulic path comprises a branch conduit connected to an inner diameter of the driveshaft. The electric machine may be supplied with fluid from the second hydraulic path via radial bores of the driveshaft connecting the inner diameter with the rotor.

According to a further embodiment, the housing includes an intermediate wall which separates the oil sump into a motor-side reservoir and a transmission-side reservoir. When the bi-directional pump is operated in the first direction of rotation, the suction side is hydraulically connected to the motor-side reservoir, and, when the bi-directional pump is operated in the second direction of rotation, the suction side is hydraulically connected to the transmission-side reservoir. The motor-side reservoir and the transmission-side reservoir may be hydraulically connected via a through-opening of the intermediate wall.

A suction filter may be arranged between the oil sump and the bi-directional pump, or between each one of the motor-side reservoir and the transmission-side reservoir and the bi-directional pump. A check valve may be arranged between the oil sump and each of the first and second pressure sides of bi-directional pump to shut off the respective one of the first and second pressure sides from the respective suction side.

BRIEF DESCRIPTION OF THE DRAWINGS

Exemplary embodiments and further advantages of the electric drive arrangement for a vehicle will be illustrated as follows with reference to the accompanying drawings.

DETAILED DESCRIPTION

Figures 1, 2, 3:
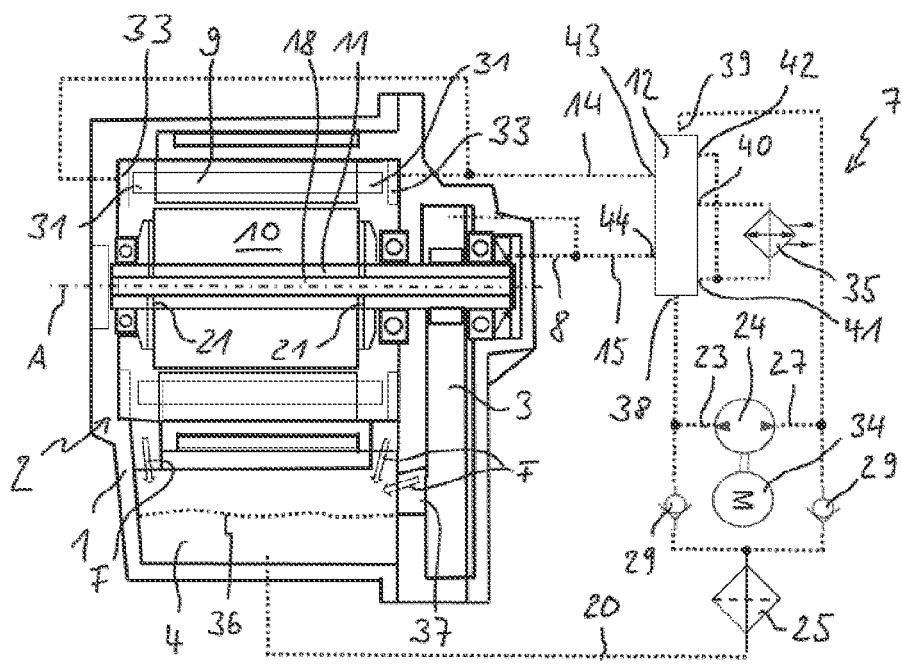
FIG. 1 shows a schematic illustration of an exemplary embodiment of the electric drive arrangement.
FIG. 2 shows a switch valve of the embodiment of FIG. 1 in a detailed schematic illustration, illustrating an operation of the bi-directional pump in a second direction of rotation.
FIG. 3 shows the switch valve of the embodiment of FIG. 1 in a detailed schematic illustration, illustrating an operation of the bi-directional pump in a first direction of rotation.

In FIG. 1, an electric drive arrangement for a vehicle is depicted, wherein a housing 1, an electric machine 2, a transmission 3 and an oil sump 4 are shown as a schematic representation of a longitudinal cut along a rotary axis A of a rotor 10 of the electric machine 2. A hydraulic circuit 7 for circulating a fluid to cool and lubricate the electric machine 2 and the transmission 3 is in part schematically depicted. In FIG. 2, a switch valve 12 of the hydraulic circuit 7 of FIG. 1 is shown in a detailed schematic illustration, the switch valve 12 being set in a second position 26. In FIG. 3, the switch valve 12 of the hydraulic circuit 7 of FIG. 1 is shown in its first position 22. FIGS. 1, 2 and 3 will be described together.

The electric machine 2 has a stator 9 connected to the housing 1. The stator 9 includes stator end-windings 31. The rotor 10 is rotatable relative to the stator 9. A driveshaft 11 is connected to the rotor 10 and rotatably supported in the housing 1 about the axis of rotation A. The transmission 3 is adapted to transmit a rotary movement from the driveshaft 11 to drive a driveline of the vehicle, which is not depicted. The transmission 3 may comprise, for example, a reduction gear, a differential drive and a coupling, which are not depicted. The fluid of the hydraulic circuit 7 is gathered in the oil sump 4 formed in a lower portion of the housing 1. A bi-directional pump 24 is hydraulically connected to the oil sump 4 on a suction side via a fluid supply line 20. Between the oil sump 4 and the suction side of the bi-directional pump 24, a suction filter 25 is arranged for filtration of the fluid. The bi-directional pump 24 is further hydraulically connected to the pump-actuated switch valve 12. A first hydraulic path 14 connects the switch valve 12 with cooling nozzles 33 of the electric machine 2 and a second hydraulic path 15 connects the switch valve 12 with a portion of the transmission 3. A heat exchanger 35 is provided for cooling the fluid pumped by the bi-directional pump 24 through the switch valve 12. When the bi-directional pump 24 is operated in a first direction of rotation, the switch valve 12 is transferred into the first position 22 as shown in FIG. 3, in the first position 22 fluid is pumped through the heat exchanger 35 to the first hydraulic path 14 for cooling the electric machine 2. When the bi-directional pump 24 is operated in a second direction of rotation, the switch valve 12 is transferred into the second position 26 as shown in FIG. 2, in the second position 26 fluid is pumped through the heat exchanger 35 to the second hydraulic path 15 for cooling and/or lubricating the transmission 3.

According to the exemplary embodiment, the switch valve 12 may have a first inlet 38 connected to a first pressure side 23 of the bi-directional pump 24 and a second inlet 39 connected to a second pressure side 27 of the bi-directional pump 24. The respective first and second pressure sides 23, 27 depend on the direction of rotation of the bi-directional pump 24. When the bi-directional pump 24 is operated in the first direction of rotation, the first pressure side 23 is pressurized, which means that the second pressure side 27 becomes the suction side of the bi-directional pump 24. When the bi-directional pump 24 is operated in the second direction of rotation, the second pressure side 27 is pressurized and the first pressure side 23 becomes the suction side of the bi-directional pump 24. A check valve 29 between each of the first and second pressure sides 23, 27 and the fluid supply line 20 prevents a backflow towards the oil sump 4. The switch valve 12 comprises a valve housing 30 enclosing a void 32. Inside the valve housing 30 a valve spool 17 is actuated into the first position 22 by pressurizing the first inlet 38. The valve spool 17 is actuated into the second position 26 by pressurizing the second inlet 39. The switch valve 12 has a first heat exchanger outlet 41 hydraulically connected to the heat exchanger 35 and a second heat exchanger outlet 42 hydraulically connected to the heat exchanger 35. When the switch valve 12 is in the first position, fluid flows from the first inlet 38 to the heat exchanger 35 and, when the switch valve 12 is in the second position, fluid flows from the second inlet 39 to the heat exchanger 35. The switch valve 12 has a third inlet 40 hydraulically connected to the heat exchanger 35, a first outlet 43 to the first hydraulic path 14 and a second outlet 44 to the second hydraulic path 15. When the valve spool 17 of the switch valve 12 is in the first position 22, fluid flows from the heat exchanger 35 to the first outlet 43 and, when the valve spool 17 of the switch valve 12 is in the second position 26, fluid flows from the heat exchanger 35 to the second outlet 44. Hydraulically connected lines are shown with a dot representing a junction. Crossing lines without a junction dot are hydraulically separated. The fluid flow through the switch valve 12 is illustrated by arrows F for both the first position 22 in FIG. 3 and the second position 26 in FIG. 2.

When the bi-directional pump 24 is operated in the first direction of rotation, the first pressure side 23 is pressurized to a first pressure level to supply fluid to the cooling nozzles 33 for spray cooling of the stator end-windings 31 of the stator 9. The cooling nozzles 33 spray the fluid under high pressure towards the stator end-windings 31, from there the fluid flows back to the oil sump 4. A dotted line 36 represents a fluid level of the oil sump 4. Arrows F illustrate the flow of the fluid. The second hydraulic path 15 is not pressurized and no fluid is actively transported to the transmission 3, which is splash lubricated from the oil sump 4. The bi-directional pump 24 is operated in the first direction of rotation advantageously for low speed operation of the vehicle and lower rotation speed of the rotor 10 and rotating parts of the transmission 3.

When the bi-directional pump 24 is operated in the second direction of rotation, the second pressure side 27 is pressurized to a second pressure level to supply fluid for active cooling of the rotor 10 and active lubrication of the transmission 3. The second pressure level may be lower than the first pressure level. The second hydraulic path 15 comprises a branch conduit 8 connected to an inner diameter 18 of the driveshaft 11. The electric machine 2 is supplied with fluid from the second hydraulic path 15 via radial bores 21 of the driveshaft 11 connecting the inner diameter 18 with the rotor 10. The fluid is centrifuged along the rotor 10 towards the stator 9, and flows back into the oil sump 4 due to gravitational force, shown by arrows F. From the transmission 3, fluid runs back into the oil sump 4. The bi-directional pump 24 is advantageously operated in the second direction of rotation for high speed operation of the vehicle and high rotation speed of the rotor 10 and rotating parts of the transmission 3.

Figure 4:
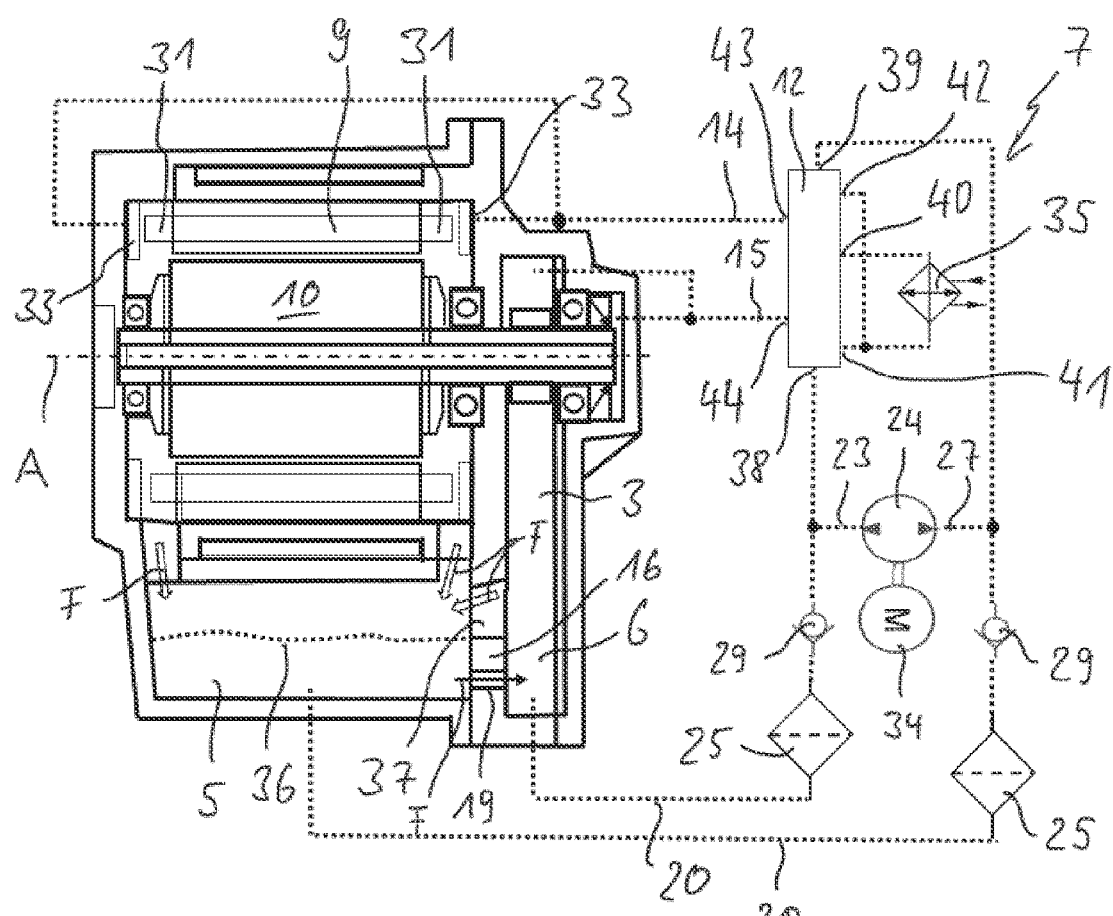
FIG. 4 shows a further exemplary embodiment of the electric drive arrangement in a schematic illustration.

In FIG. 4, a second exemplary embodiment of the electric drive arrangement is shown in an identical schematic illustration as the first embodiment. Identical parts are denoted with the same reference numerals. The electric drive according to the second embodiment is further identical with regard to the housing 1, the electric machine 2, the transmission 3 and the reservoir 4, which are not described in detail again. Reference is made to the description above. As the switch valve 12 of the second exemplary embodiment can be identical to the switch valve 12 of the first embodiment, reference is further made to FIGS. 2 and 3, as described above.

The housing 1 includes an intermediate wall 16, which separates the reservoir 4 into a motor-side reservoir 5 and a transmission-side reservoir 6, which are connected via a through-opening 19 of the intermediate wall 16. The motor-side reservoir 5 and the transmission-side reservoir 6 are each hydraulically connected to the bi-directional pump 24 via two separate fluid supply lines 20, each connected to one possible suction side of the bi-directional pump 24, depending on the direction of rotation. Both fluid supply lines 20 comprise one of the two suction filters 25 for filtration of the fluid.

When the bi-directional pump 24 is operated in the first direction of rotation, the first pressure side 23 is pressurized and the motor-side reservoir 5 is hydraulically connected to the suction side of the bi-directional pump 24. When the switch valve 12 is at the first position 22, fluid is supplied via the first hydraulic path 14 to the cooling nozzles 33 for spray cooling of the stator end-windings 31 of the stator 9. The transmission 3 is splash lubricated from the transmission-side reservoir 6. A passage 37 in the intermediate wall 16 above the through-opening 19 allows fluid dripping off the transmission 3 to flow into the machine-side reservoir 5. Due to the through-opening 19, a fluid level 36 in the machine-side reservoir 5 is balanced with the fluid level in the transmission-side reservoir 6.

When the bi-directional pump 24 is operated in the second direction of rotation, the second pressure side 27 is pressurized and the transmission-side reservoir 6 is hydraulically connected to the suction side of the bi-directional pump 24. When the switch valve 12 is at the second position 22, fluid is supplied to the second hydraulic path 15 for active cooling of the rotor 10 and active lubrication of the transmission 3. A fraction of the fluid runs back from the transmission 3 through the passage 37 in the intermediate wall 16 into the machine-side reservoir 5. The fluid supplied to the rotor 10 also flows into the machine-side reservoir 5. As the fluid from the transmission-side reservoir 6 flows to the suction side of the bi-directional pump 24, the fluid level in the transmission-side reservoir 6 can advantageously be reduced. The flow through the through-opening 19, illustrated by the arrow F, can be adjusted by choosing an adequate diameter for through-opening 19. The diameter of through-opening 19 provides that the fluid level 36 of the machine-side reservoir 5 is higher than in the transmission-side reservoir 6 to advantageously keep churning losses low under high speed operation of the vehicle.

REFERENCE NUMERALS

1 Housing
2 Electric machine
3 Transmission
4 Oil sump
5 Motor-side reservoir
6 Transmission-side reservoir
7 Hydraulic circuit
8 Branch conduit
9 Stator
10 Rotor
11 Driveshaft
12 Switch valve
14 First hydraulic path
15 Second hydraulic path
16 Intermediate wall
17 Spool
18 Inner diameter of the rotor shaft
19 Through-opening
20 Fluid supply line
21 Radial bore
22 First position
23 First suction side
24 Bi-directional pump
25 Filter
26 Second position
27 Second suction side
28 Junction
29 Check valve
30 Valve housing
31 Stator end windings
32 Void
33 Spray nozzles
34 Electric motor
Heat exchanger
36 Fluid level
37 Passage
38 First inlet
39 Second inlet
40 Third inlet
41 First heat exchanger outlet
42 Second heat exchanger outlet
43 First outlet
44 Second outlet
45 A Rotary axis
F Arrows

The invention claimed is:

1. An electric drive arrangement for a vehicle, the electric drive arrangement comprising:
    a housing;
    an electric machine with a stator connected to the housing and a rotor with a rotor shaft rotatably supported in the housing;
    a transmission to transmit a rotary movement from the rotor shaft to drive a driveline of the vehicle; and
    a hydraulic circuit for circulating a fluid to cool and lubricate the electric machine and the transmission, the hydraulic circuit comprising a bi-directional pump which on a suction side is hydraulically connected to an oil sump of the housing, a pump-actuated switch valve hydraulically connected to the bi-directional pump, a first hydraulic path connecting the switch valve with cooling nozzles of the electric machine, a second hydraulic path connecting the switch valve with a portion of the transmission, and a heat exchanger for cooling the fluid pumped by the bi-directional pump through the switch valve;
    wherein, operation of the bi-directional pump in a first direction of rotation transfers the switch valve into a first position in which fluid is pumped through the heat exchanger to the first hydraulic path for cooling the electric machine, and, operation of the bi-directional pump in a second direction of rotation transfers the switch valve into a second position in which fluid is pumped through the heat exchanger to the second hydraulic path for cooling and/or lubricating the transmission.

2. The electric drive arrangement according to claim 1, wherein the switch valve has a first inlet connected to a first pressure side of the bi-directional pump and a second inlet connected to a second pressure side of the bi-directional pump.

3. The electric drive arrangement according to claim 2, wherein the switch valve is actuated into the first position by pressurizing the first inlet and into the second position by pressurizing the second inlet.

4. The electric drive arrangement according to claim 2, wherein the switch valve has a first heat exchanger outlet hydraulically connected to the heat exchanger and a second heat exchanger outlet hydraulically connected to the heat exchanger, and wherein, fluid flows from the first inlet to the heat exchanger when the switch valve is in the first position, and, fluid flows from the second inlet to the heat exchanger when the switch valve is in the second position.

5. The electric drive arrangement according to claim 2, wherein operation of the bi-directional pump in the first direction of rotation pressurizes the first pressure side to a first pressure level and supplies fluid to the cooling nozzles for cooling stator end-windings of the stator.

6. The electric drive arrangement according to claim 5, wherein operation of the bi-directional pump in the second direction of rotation pressurizes the second pressure side to a second pressure level and supplies fluid for active cooling of the rotor and active lubrication of the transmission.

7. The electric drive arrangement according to claim 6, wherein the first pressure level is higher than the second pressure level.

8. The electric drive arrangement according to claim 1, wherein the switch valve has a third inlet hydraulically connected to the heat exchanger, a first outlet to the first hydraulic path, and a second outlet to the second hydraulic path, and wherein fluid flows from the heat exchanger to the first outlet when the switch valve is in the first position and fluid flows from the heat exchanger to the second outlet when the switch valve is in the second position.

9. The electric drive arrangement according to claim 1, wherein the second hydraulic path comprises a branch conduit connected to an inner diameter of the driveshaft.

10. The electric drive arrangement according to claim 1, wherein the driveshaft comprises radial bores connecting the inner diameter to the rotor for supplying the electric machine with fluid from the second hydraulic path in a high speed mode.

11. The electric drive arrangement according to claim 1, wherein the housing includes an intermediate wall which separates the oil sump into a motor-side reservoir and a transmission-side reservoir, wherein operation of the bi-directional pump in the first direction of rotation hydraulically connects the suction side to the motor-side reservoir, and operation of the bi-directional pump in the second direction of rotation is hydraulically connects the suction side to the transmission-side reservoir.

12. The electric drive arrangement according to claim 11, wherein the motor-side reservoir and the transmission-side reservoir are hydraulically connected via a through-opening of the intermediate wall.

13. The electric drive arrangement according to claim 1, wherein a suction filter is arranged between the oil sump and the bi-directional pump.

14. The electric drive arrangement according to claim 1, wherein a check valve is arranged between the oil sump and the bi-directional pump.

15. An electric drive arrangement for a vehicle, the electric drive arrangement comprising:
   a housing;
   an electric machine with a stator connected to the housing and a rotor with a rotor shaft rotatably supported in the housing;
   a transmission to transmit a rotary movement from the rotor shaft to drive a driveline of the vehicle; and
   a hydraulic circuit for circulating a fluid to cool and lubricate the electric machine and the transmission, the hydraulic circuit comprising a bi-directional pump which on a suction side is hydraulically connected to an oil sump of the housing, a pump-actuated switch valve hydraulically connected to the bi-directional pump, a first hydraulic path connecting the switch valve with cooling nozzles of the electric machine, a second hydraulic path connecting the switch valve with a portion of the transmission, and a heat exchanger for cooling the fluid pumped by the bi-directional pump through the switch valve;
   wherein, operation of the bi-directional pump in a first direction of rotation transfers the switch valve into a first position in which fluid is pumped through the heat exchanger to the first hydraulic path for cooling the electric machine, and operation of the bi-directional pump in a second direction of rotation transfers the switch valve into a second position in which fluid is pumped through the heat exchanger to the second hydraulic path for cooling and/or lubricating the transmission; and
   wherein the switch valve has a first inlet connected to a first pressure side of the bi-directional pump and a second inlet connected to a second pressure side of the bi-directional pump.

16. An electric drive arrangement for a vehicle, the electric drive arrangement comprising:
   a housing;
   an electric machine with a stator connected to the housing and a rotor with a rotor shaft rotatably supported in the housing;
   a transmission to transmit a rotary movement from the rotor shaft to drive a driveline of the vehicle; and
   a hydraulic circuit for circulating a fluid to cool and lubricate the electric machine and the transmission, the hydraulic circuit comprising a bi-directional pump which on a suction side is hydraulically connected to an oil sump of the housing, a pump-actuated switch valve hydraulically connected to the bi-directional pump, a first hydraulic path connecting the switch valve with cooling nozzles of the electric machine, a second hydraulic path connecting the switch valve with a portion of the transmission, and a heat exchanger for cooling the fluid pumped by the bi-directional pump through the switch valve;
   wherein, operation of the bi-directional pump in a first direction of rotation transfers the switch valve into a first position in which fluid is pumped through the heat exchanger to the first hydraulic path for cooling the electric machine, and, when the bi-directional pump is operated in a second direction of rotation, the switch valve is transferred into a second position in which fluid is pumped through the heat exchanger to the second hydraulic path for cooling and/or lubricating the transmission; and
   wherein the second hydraulic path comprises a branch conduit connected to an inner diameter of the driveshaft.

* * * * *